United States Patent
Ma et al.

(10) Patent No.: US 10,983,839 B2
(45) Date of Patent: Apr. 20, 2021

(54) METHOD, APPARATUS, AND ELECTRONIC DEVICE FOR IMPROVING CPU PERFORMANCE

(71) Applicant: Advanced New Technologies Co., Ltd., Grand Cayman (KY)

(72) Inventors: Ling Ma, Hangzhou (CN); Changhua He, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/743,971

(22) Filed: Jan. 15, 2020

(65) Prior Publication Data
US 2020/0226001 A1 Jul. 16, 2020

(30) Foreign Application Priority Data
Jan. 16, 2019 (CN) .......................... 201910039771.4

(51) Int. Cl.
*G06F 9/52* (2006.01)
*G06F 9/50* (2006.01)
(Continued)

(52) U.S. Cl.
CPC ............ *G06F 9/526* (2013.01); *G06F 9/3851* (2013.01); *G06F 9/50* (2013.01); *G06F 9/5022* (2013.01);
(Continued)

(58) Field of Classification Search
None
See application file for complete search history.

(56) References Cited

U.S. PATENT DOCUMENTS 6,760,909 B1 7/2004 Draves et al.
9,842,010 B1 * 12/2017 Burke ...................... G06F 9/52
(Continued)

FOREIGN PATENT DOCUMENTS

CN 100585567 1/2010
CN 104461729 3/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Qing Yuan Wu
(74) *Attorney, Agent, or Firm* — Fish & Richardson P.C.

(57) ABSTRACT

Implementations of this specification provide a method, an apparatus, and an electronic device for improving performance of a central processing unit (CPU) comprising a plurality of CPU dies. The method includes the following: enabling threads in each CPU die of the CPU to compete for a mutex of a respective CPU die; identifying the plurality of threads that have obtained the mutexes; enabling the plurality of threads that have obtained the mutexes to compete for a spin lock of the CPU; identifying, from the plurality of threads, a target thread that has obtained the spin lock; executing a critical section corresponding to the target thread that has obtained the spin lock; and releasing the mutex and the spin lock that are obtained by the target thread.

18 Claims, 7 Drawing Sheets

(51) Int. Cl.
    *G06F 9/38*     (2018.01)
    *G06F 16/176*     (2019.01)
    *G06F 13/36*     (2006.01)

(52) U.S. Cl.
    CPC .......... *G06F 9/5027* (2013.01); *G06F 9/5044* (2013.01); *G06F 9/52* (2013.01); *G06F 13/36* (2013.01); *G06F 16/176* (2019.01)

(56) References Cited

U.S. PATENT DOCUMENTS

| | | | |
|---|---|---|---|
| 10,585,719 B2* | 3/2020 | Dice | G06F 9/526 |
| 2005/0081204 A1 | 4/2005 | Schopp | |
| 2013/0290583 A1 | 10/2013 | Dice et al. | |
| 2015/0286586 A1* | 10/2015 | Yadav | G06F 12/1466 |
| | | | 711/152 |
| 2016/0092280 A1* | 3/2016 | Al | G06F 8/314 |
| | | | 718/106 |

FOREIGN PATENT DOCUMENTS

| | | |
|---|---|---|
| CN | 105975349 | 9/2016 |
| CN | 108446181 | 8/2018 |
| TW | 201706843 | 2/2017 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Appln No. PCT/US2020/012747, dated May 8, 2020, 15 pages.

Dice et al, "Lock Cohorting: A General Technique for Designing NUMA Locks." ACM Transactions on Parallel Computing, Feb. 18, 2015, 42 pages.

* cited by examiner

METHOD, APPARATUS, AND ELECTRONIC DEVICE FOR IMPROVING CPU PERFORMANCE

CROSS-REFERENCE TO RELATED APPLICATIONS

This application claims priority to Chinese Patent Application No. 201910039771.4, filed on Jan. 16, 2019, which is hereby incorporated by reference in its entirety.

TECHNICAL FIELD

Implementations of this specification relate to the field of Internet technologies, and in particular, to a method, an apparatus, and an electronic device for improving CPU performance.

BACKGROUND

When a central processing unit (CPU) processes a plurality of threads that execute a critical section, a critical section of only one thread is executed at a time. Therefore, the plurality of threads need to compete for a spin lock of the CPU.

FIG. 1 is a schematic flowchart illustrating spin lock competition.

Step 1: Start. When a plurality of threads execute a critical section concurrently, these threads compete for a spin lock of a CPU.

Step 2: Determine whether a target thread obtains the spin lock. If yes, go to step 4. If no, go to step 3.

Step 3: A thread that has not obtained the spin lock continuously detects whether the spin lock is released. If the spin lock is released, go to step 2.

Step 4: In a CPU die in which the target thread that has obtained the spin lock is located, start to execute a critical section of the target thread.

Step 5: After the critical section of the target thread is executed, release the spin lock obtained by the target thread.

It can be seen from FIG. 1 that if the number of running threads is greater than the number of CPU dies, and a CPU executing a critical section has only one thread (i.e., an owner of a spin lock), but an operating system does not know which thread is the owner of the spin lock, to ensure fairness between threads, execution of a critical section by the owner of the spin lock is often interrupted to wake up a thread that is waiting for the spin lock. However, because execution of the critical section has not been completed, and the spin lock has not been released, the spin lock cannot be competed for even if other threads that are waiting for the spin lock are woken up. Therefore, unnecessary detection operations performed by the thread increase, and it takes a longer time to execute the critical section because owners of the spin lock are often interrupted.

SUMMARY

Implementations of this specification provide a method, an apparatus, and an electronic device for improving CPU performance, to reduce problems that efficiency is relatively low when a CPU executes a critical section.

According to a first aspect of the implementations of this specification, a method for improving CPU performance is provided, where a corresponding mutual exclusion lock (mutex) is disposed for each CPU die in a CPU, and the method includes the following: enabling a thread in each CPU die to compete for a mutex of the CPU die in which the thread is located to obtain a thread that has obtained the mutex, enabling the thread that has obtained the mutex to compete for a spin lock of the CPU to obtain a target thread that has obtained the spin lock, executing a critical section corresponding to the target thread that has obtained the spin lock, and after the critical section corresponding to the target thread is executed, releasing the mutex and the spin lock that are obtained by the target thread.

Optionally, releasing the mutex and the spin lock that are obtained by the target thread includes the following: first releasing the spin lock obtained by the target thread, and then releasing the mutex obtained by the target thread.

Optionally, the method further includes the following: enabling a thread that has not obtained the spin lock to continuously detect whether the spin lock is released, so that the thread that has not obtained the spin lock re-competes for the spin lock of the CPU after detecting that the spin lock is released.

Optionally, the method further includes the following: enabling a thread that has not obtained the spin lock to sleep to release an occupied resource of a CPU die in which the thread is located.

Optionally, after releasing the mutex obtained by the target thread, the method further includes the following: if there is a sleeping thread for the released mutex, waking up the sleeping thread, so that the sleeping thread enters a CPU die corresponding to the mutex to re-compete for the mutex.

Optionally, the mutex of the CPU die is located in a private cache of the CPU.

According to a second aspect of the implementations of this specification, an apparatus for improving CPU performance is provided, where a corresponding mutex is disposed for each CPU die in a CPU, and the apparatus includes the following: a first competition unit, configured to enable a thread in each CPU die to compete for a mutex of the CPU die in which the thread is located to obtain a thread that has obtained the mutex, a second competition unit, configured to enable the thread that has obtained the mutex to compete for a spin lock of the CPU to obtain a target thread that has obtained the spin lock, an execution unit, configured to execute a critical section corresponding to the target thread that has obtained the spin lock, and a releasing unit, configured to: after the critical section corresponding to the target thread is executed, release the mutex and the spin lock that are obtained by the target thread.

Optionally, the releasing unit is configured to: after the critical section corresponding to the target thread is executed, first release the spin lock obtained by the target thread, and then release the mutex obtained by the target thread.

Optionally, the apparatus further includes the following: a checking subunit, configured to enable a thread that has not obtained the spin lock to continuously detect whether the spin lock is released, so that the thread that has not obtained the spin lock re-competes for the spin lock of the CPU after detecting that the spin lock is released.

Optionally, the apparatus further includes the following: a sleeping subunit, configured to enable a thread that has not obtained the spin lock to sleep to release an occupied resource of a CPU die in which the thread is located.

Optionally, the apparatus further includes the following: a wakeup subunit, configured to: if there is a sleeping thread for the released mutex, wake up the sleeping thread, so that the sleeping thread enters a CPU die corresponding to the mutex to re-compete for the mutex.

Optionally, the mutex of the CPU die is located in a private cache of the CPU.

According to a fifth aspect of the implementations of this specification, an electronic device is provided, including the following: a processor, and a memory, configured to store an instruction that can be executed by the processor, where the processor is configured to perform the previous method for improving CPU performance.

In the implementations of this specification, a solution for improving CPU performance is provided. A mutex is introduced for each CPU die in a spin lock, so that an owner of the spin lock can occupy all CPU resources while ensuring low overheads of the spin lock. As such, execution of a critical section is faster, and overall CPU processing performance is improved.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following do not represent all implementations consistent with this specification. On the contrary, the implementations are only examples of apparatuses and methods that are described in the appended claims in detail and consistent with some aspects of this specification.

The terms used in this specification are merely for illustrating specific implementations, and are not intended to limit this specification. The terms "a" and "the" of singular forms used in this specification and the appended claims are also intended to include plural forms, unless otherwise specified in the context clearly. It is further worthwhile to note that the term "and/or" used in this specification indicates and includes any or all possible combinations of one or more associated listed items.

It is worthwhile to note that although terms "first", "second", "third", etc. may be used in this specification to describe various types of information, the information is not limited to the terms. These terms are only used to differentiate information of the same type. For example, without departing from the scope of this specification, first information can also be referred to as second information, and similarly, the second information can be referred to as the first information. Depending on the context, for example, the word "if" used here can be explained as "while", "when", or "in response to determining".

A CPU is an ultra-large-scale integrated circuit, and is brain of a computer device. The CPU is mainly used to explain a computer instruction and process data in computer software.

Figure 1:
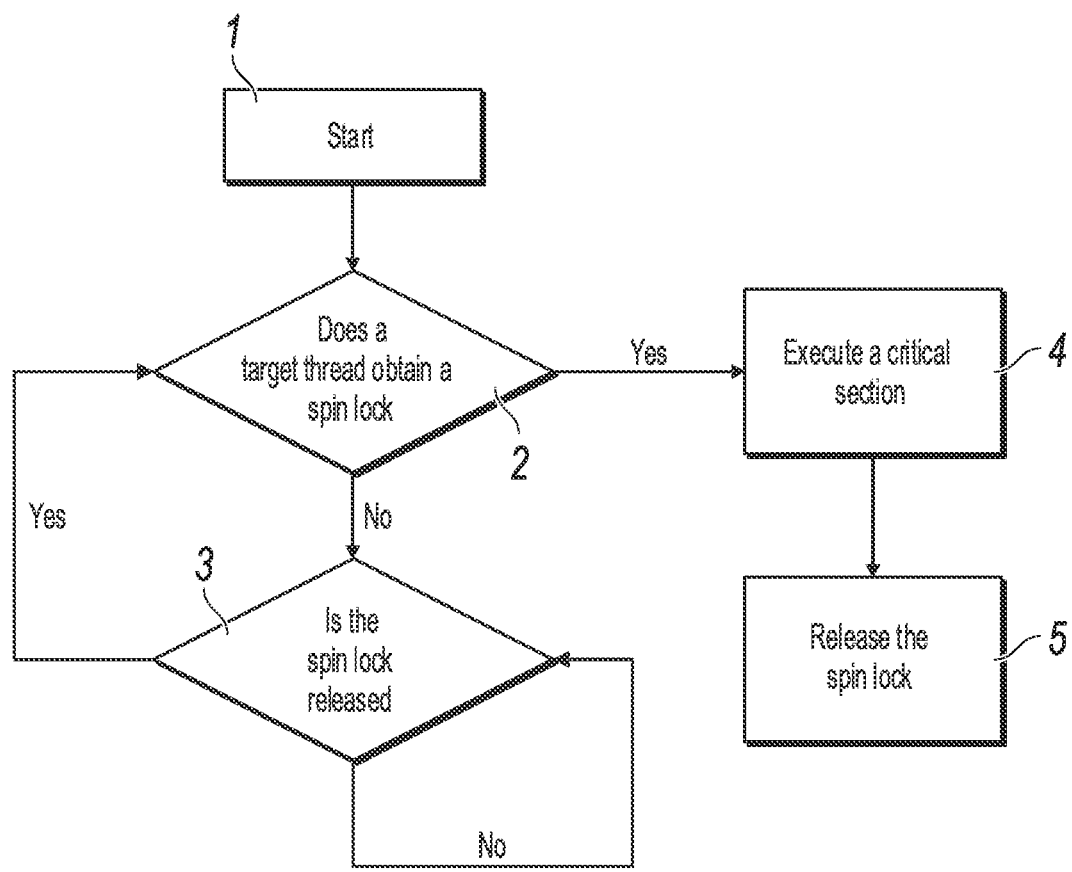
FIG. 1 is a schematic flowchart illustrating existing spin lock competition, according to an implementation of this specification.
Figure 2A:
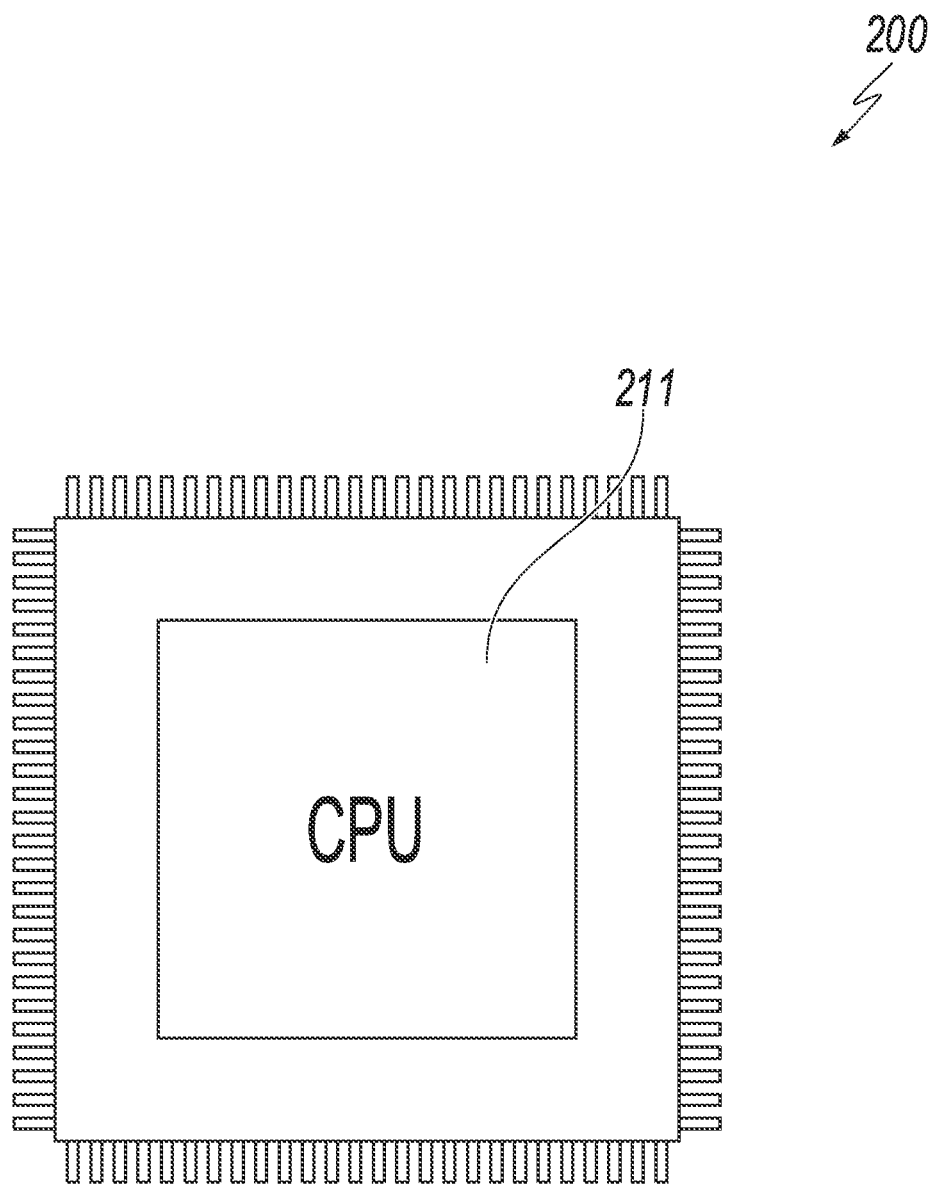
FIG. 2a is a schematic diagram illustrating a CPU, according to an implementation of this specification.

Refer to a schematic diagram of a CPU provided in this specification shown in FIG. 2a. FIG. 2a is an entire CPU 200, and a small square in a front center of the CPU 200 is a CPU die 211. The CPU die 211 is the most important component of the CPU 200. Generally, the CPU die 211 can be made of monocrystalline silicon through a specific production process. Calculation and acceptance/storage commands and data processing of the CPU 200 are all performed by the CPU die 211. Generally, the CPU die 211 can have a fixed logical structure, and at least logical units such as a level 1 cache, a level 2 cache, an execution unit, an instruction-level unit, and a bus interface are disposed.

Generally, one CPU can include one or more CPU dies, and one CPU die can include one or more CPU cores. Referring to a schematic architectural diagram illustrating a CPU shown in FIG. 2b, the CPU includes four CPU dies (dies in the figure), and each CPU die includes four CPU cores (cores in the figure). Generally, each CPU core can execute one thread, in other words, one CPU core can correspond to one thread.

It is worthwhile to note that the thread in this specification can be a thread, or can be a process.

As described above, when processing a plurality of threads executing a critical section, the CPU executes a critical section of only one thread at a time. When threads in a plurality of CPU dies execute the same critical section concurrently, the threads in these CPU dies need to compete for a spin lock, and only a target thread that has obtained the spin lock can execute the critical section. After executing the critical section, the target thread releases the obtained spin lock, and then another thread continues to compete for the spin lock. This is repeated until all the threads executing the critical section complete execution of the critical section.

As described above, in an existing spin lock competition mechanism, an operating system does not know which thread is an owner of the spin lock. Therefore, to ensure fairness between threads, execution of the critical section by the owner of the spin lock is often interrupted to wake up a thread that is waiting for the spin lock. However, because the target thread has not completed execution of the critical section, and the spin lock has not been released, the spin lock cannot be competed for even if the thread that is waiting for the spin lock is woken up. Therefore, a detection operation performed by the thread is unnecessary, and it takes a longer time to execute the critical section because the owner of the spin lock is often interrupted. In addition, the thread that is waiting for the spin lock still occupies a valuable CPU resource, and the target thread that has obtained the spin lock cannot use all CPU resources to execute the critical section. As such, the time for executing the critical section is extended.

Therefore, a new spin lock competition mechanism needs to be provided to reduce problems that efficiency is relatively low when a CPU executes a critical section.

This specification provides a solution for improving CPU performance. A spin lock processing procedure is improved, and a mutex is introduced for each CPU die in a spin lock, so that an owner of the spin lock can occupy all CPU resources while ensuring low overheads of the spin lock. As such, execution of a critical section is faster, and overall CPU processing performance is improved (to approximate to a theoretical value).

Figure 3:
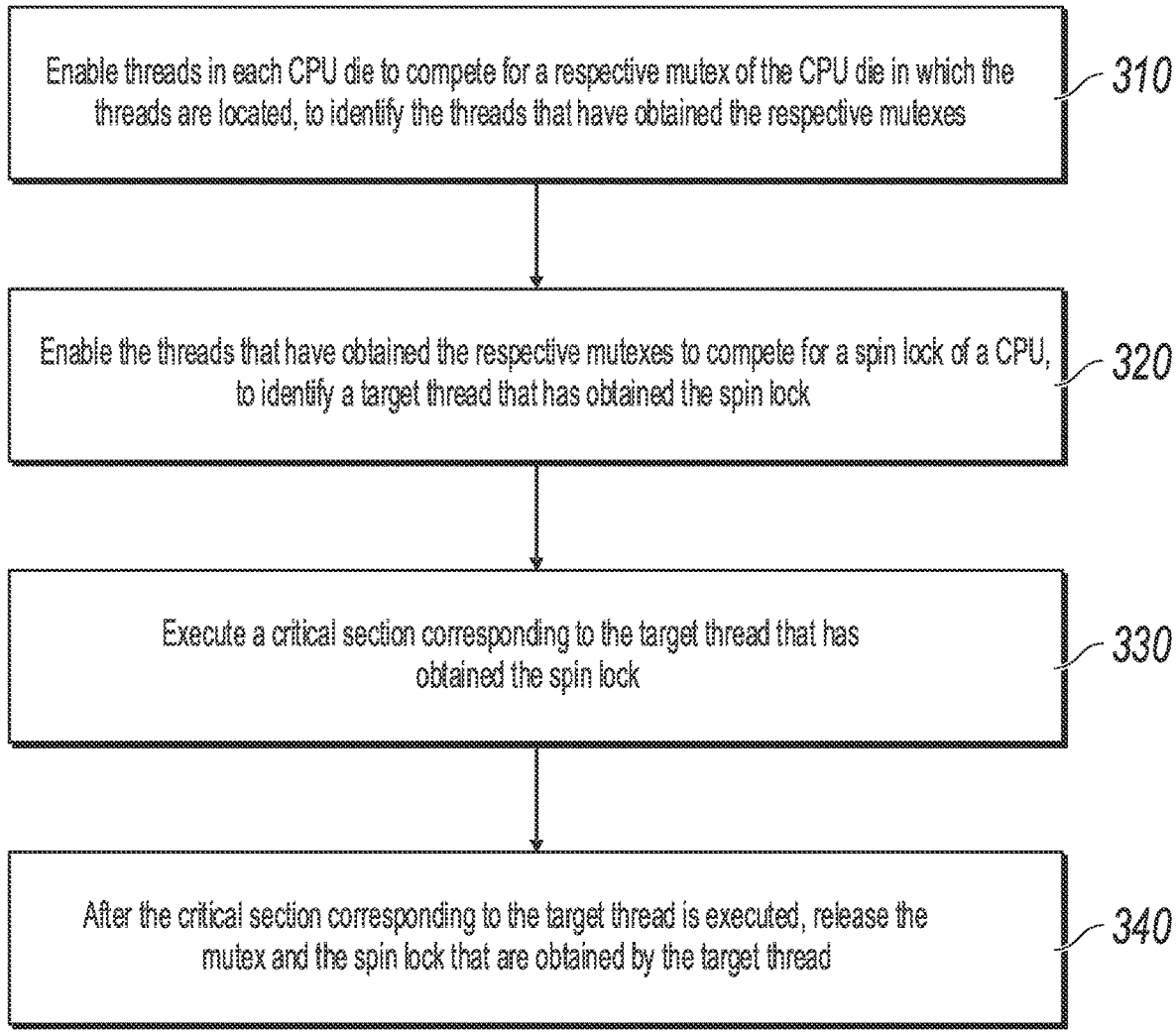
FIG. 3 is a flowchart illustrating a method for improving CPU performance, according to an implementation of this specification.

As shown in FIG. 3, the following provides a method for improving CPU performance in this specification. The method can be applied to a CPU, and a corresponding mutex is disposed for each CPU die in the CPU. The method includes the following steps:

Step 310: Enable threads in each CPU die to compete for a respective mutex of the CPU die in which the threads are located, to obtain threads that have obtained the respective mutexes.

Step 320: Enable the threads that have obtained the respective mutexes to compete for a spin lock of the CPU, to obtain a target thread that has obtained the spin lock.

Step 330: Execute a critical section corresponding to the target thread that has obtained the spin lock.

Step 340: After the critical section corresponding to the target thread is executed, release the mutex and the spin lock that are obtained by the target thread.

In this specification, a corresponding mutex is disposed for each CPU die inside a spin lock disposed in the original CPU.

Figure 2B:
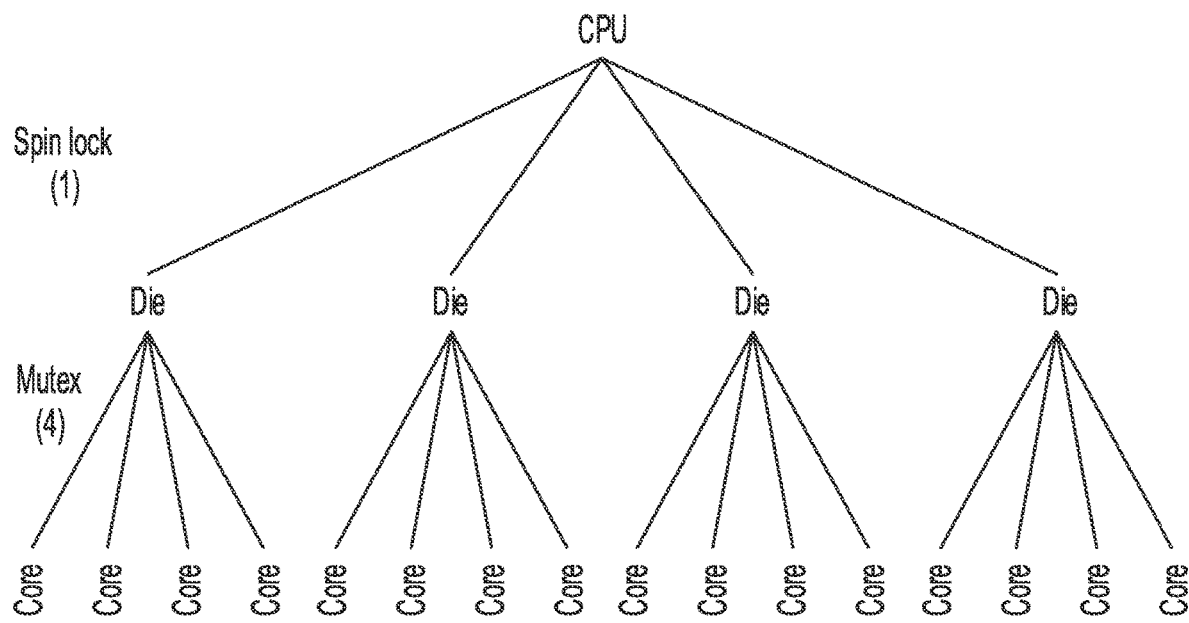
FIG. 2b is a schematic architectural diagram illustrating a CPU, according to an implementation of this specification.

As shown in FIG. 2b, the CPU can include four CPU dies. Therefore, a mutex 411 can be allocated to each CPU die, and the CPU further includes one spin lock 421. Therefore, a total of five locks: four mutexes and one spin lock are disposed in the CPU.

Figure 4:
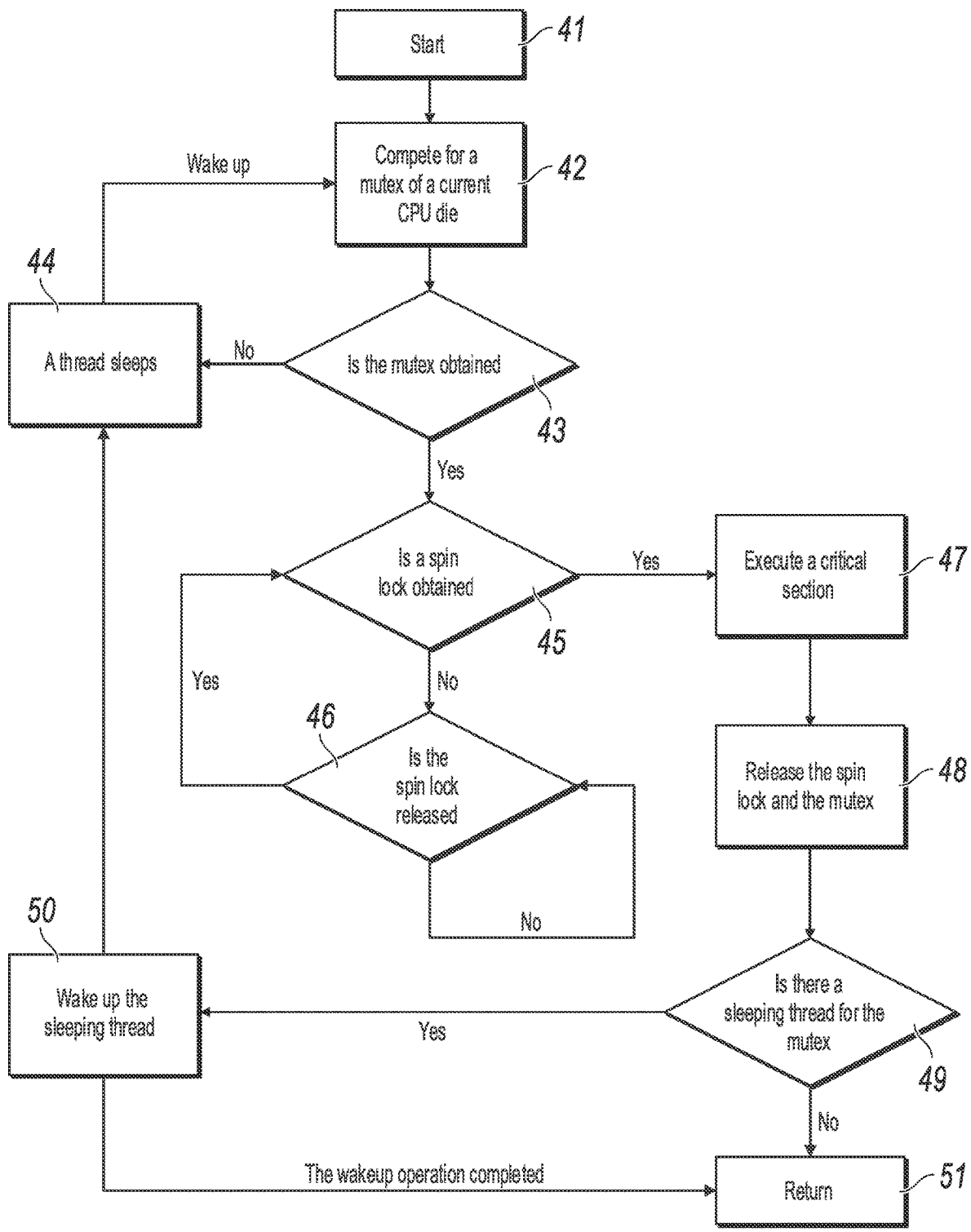
FIG. 4 is a schematic flowchart illustrating mutex and spin lock competition, according to an implementation of this specification.

FIG. 4 is a schematic flowchart illustrating mutex and spin lock competition.

Step 41: Start.

Step 42: Compete for a mutex of a current CPU die. When a plurality of threads execute a critical section concurrently, a thread in each CPU die competes for a mutex of the CPU die in which the thread is located.

Step 43: Determine whether the mutex is obtained. Each CPU die corresponds to one mutex, and therefore, a thread that has obtained the mutex in each CPU die can be obtained.

If yes (the mutex of the current CPU die is obtained), go to step 45.

If no (the mutex of the current CPU die is not obtained), go to step 44.

Step 44: A thread sleeps.

In the present step, a thread that has not obtained the mutex can sleep to release an occupied resource of a CPU die in which the thread is located, and wait to be woken up. Once a sleeping thread is woken up, step 42 is performed to re-compete for a mutex of a CPU die in which the thread is located. Generally, after a thread enters a CPU die, a correspondence between the thread and the CPU die can be established. Here, the correspondence is still maintained when the thread is sleeping, and the thread returns to the corresponding CPU die based on an index after being woken up.

A thread is enabled to sleep, so that the sleeping thread no longer occupies a CPU resource. As such, a target thread that has obtained a spin lock can maximally use CPU resources, so that execution of a critical section is faster, an execution time is shorter, and overall CPU performance is improved.

Step 45: Determine whether a spin lock is obtained. The thread that has obtained the mutex is enabled to compete for the spin lock of the CPU to obtain a target thread that has obtained the spin lock.

If yes (the spin lock is obtained), go to step 47.
If no (the spin lock is not obtained), go to step 46.

Step 46: Determine whether the spin lock is released. A thread that has not obtained the spin lock can continuously detect whether the spin lock is released.

If yes (it is detected that the spin lock is released), go to step 45 to re-compete for the spin lock.

If no (it is detected that the spin lock is not released), repeat step 46.

Step 47: Execute a critical section. Specifically, the critical section corresponding to the target thread that has obtained the spin lock is executed.

Step 48: Release the spin lock and the mutex. Specifically, after the critical section corresponding to the target thread is executed, the mutex and the spin lock that are obtained by the target thread are released.

In an implementation, the spin lock obtained by the target thread can be first released, and then the mutex obtained by the target thread is released.

Step 49: Determine whether there is a sleeping thread for the mutex. Specifically, after the mutex obtained by the target thread is released, it further needs to be determined whether there is a sleeping thread for the mutex.

If yes (there is a sleeping thread), go to step 50.
If no (there is no sleeping thread), go to step 51.

Step 50: Wake up the sleeping thread. If there is a sleeping thread for the released mutex, the sleeping thread is woken up, so that the sleeping thread enters a CPU die corresponding to the mutex to re-compete for the mutex. After the wakeup operation is completed, step 51 is performed.

Step 51: Return. The target thread completes execution.

It is worthwhile to note that in step 43, because each CPU die corresponds to one mutex, it can be ensured that only one thread in each CPU die can obtain a mutex through competition (i.e., is in an active state), and only one thread can obtain a spin lock. It is worthwhile to note that according to an embodiment provided in this specification, an owner of the spin lock is also an owner of a mutex of a CPU die. As such, the owner of the spin lock is not interrupted in a single-core CPU, so that an operation on the critical section can be performed faster, and overall CPU processing performance is improved.

After the owner of the spin lock executes the critical section, the spin lock is released. As such, another active thread (a thread that has obtained a mutex but has not obtained the spin lock) can compete for the spin lock. Finally, threads that are waiting for the same mutex of the CPU die are woken up.

It is worthwhile to note that in this specification, one mutex is allocated to each CPU die, and only threads in the same CPU die that need to be serialized can use the mutex. The mutex allows a thread that has not obtained the mutex to leave the CPU and sleep. In addition, content of the mutex can be in a private cache of the CPU. Therefore, an operation for the mutex is very fast.

In this implementation provided in this specification, not all threads that are waiting for the spin lock in different CPU dies need to sleep. Once the owner of the spin lock releases the spin lock, another competitor (a thread that has obtained a mutex but has not obtained the spin lock) can quickly obtain the spin lock without performing context switching (it usually takes time to perform context switching).

In conclusion, this specification provides a solution for improving CPU performance. A spin lock processing procedure is improved, and a mutex is introduced for each CPU die in the spin lock, so that the owner of the spin lock can occupy all CPU resources while ensuring low overheads of the spin lock. As such, execution of the critical section is faster, and overall CPU processing performance is improved (to a nearly theoretical value).

Figure 5:
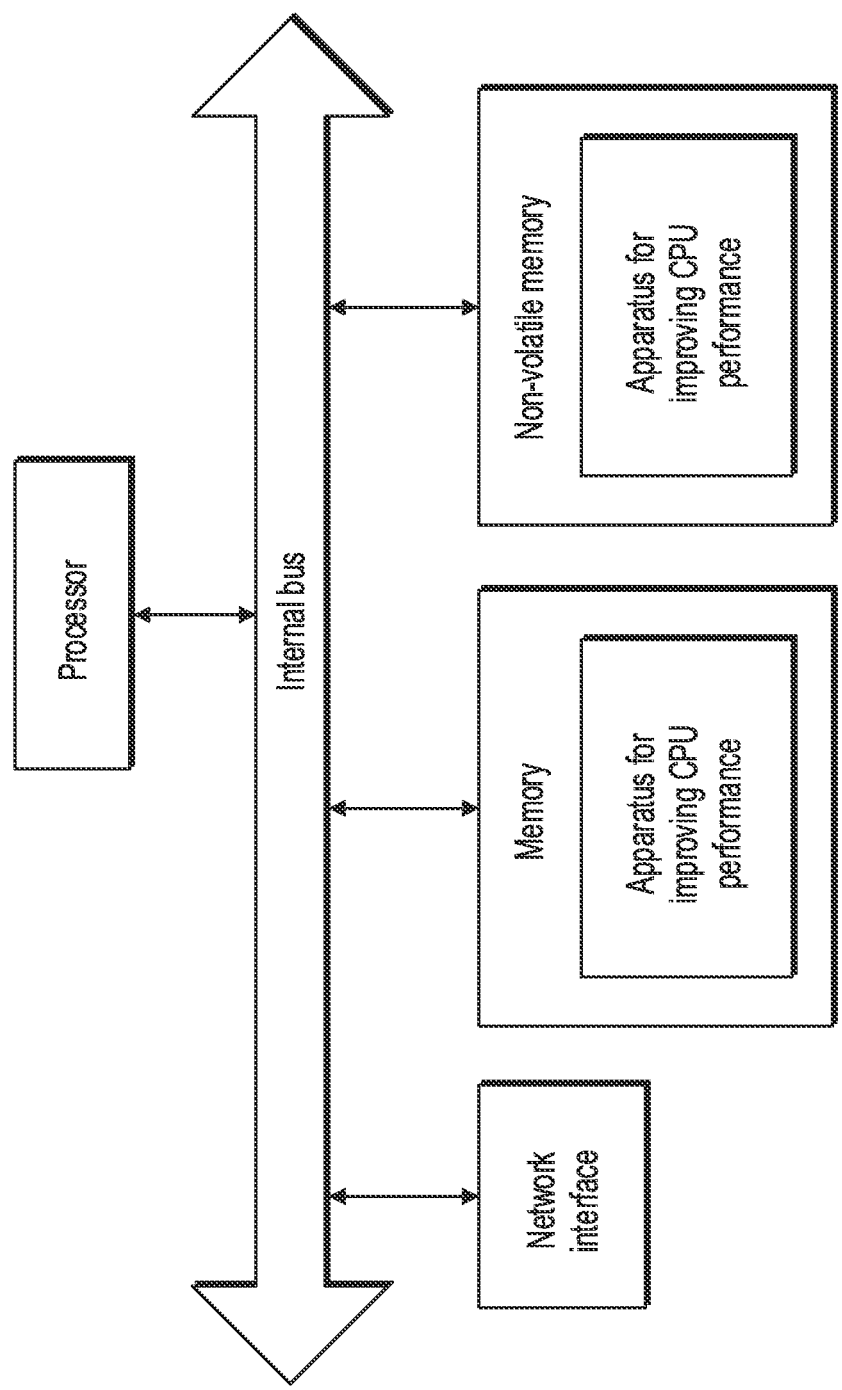
FIG. 5 is a structural diagram illustrating hardware of an apparatus for improving CPU performance, according to an implementation of this specification.

Corresponding to the previous implementation of the method for improving CPU performance, this specification further provides an implementation of an apparatus for improving CPU performance. The apparatus implementation can be implemented by software, hardware, or a combination of hardware and software. Software implementation is used as an example. As a logical apparatus, the apparatus is formed by reading a corresponding computer service program instruction in a non-volatile memory to a memory by a processor of a device where the apparatus is located. In terms of hardware, FIG. 5 is a structural diagram illustrating hardware of a device where the apparatus for improving CPU performance is located in this specification. In addition to a processor, a network interface, a memory, and a non-volatile memory shown in FIG. 5, the device where the apparatus is located in the implementations can usually include other hardware based on an actual function of improving CPU performance. Details are omitted for simplicity.

Figure 6:
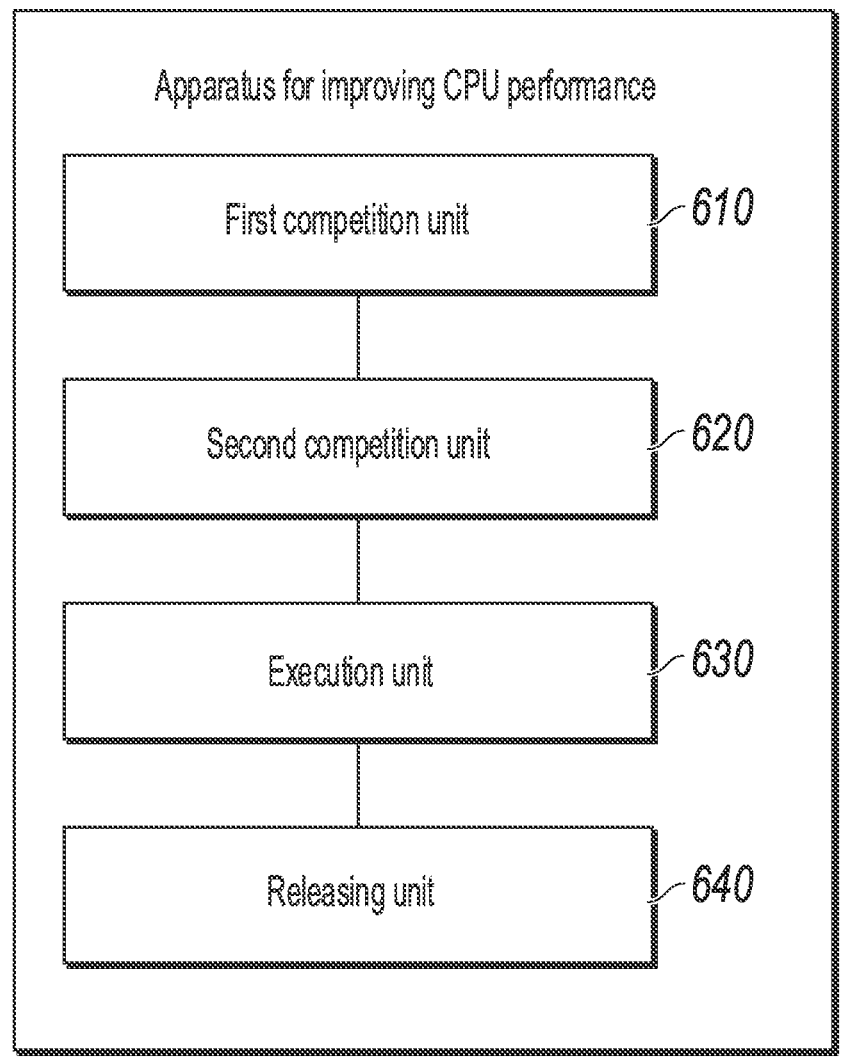
FIG. 6 is a schematic diagram illustrating modules of an apparatus for improving CPU performance, according to an implementation of this specification.

FIG. 6 is a diagram illustrating modules of an apparatus for improving CPU performance, according to an implementation of this specification. The apparatus corresponds to the implementation shown in FIG. 3. A corresponding mutex is disposed for each CPU die in a CPU. The apparatus includes the following: a first competition unit 610, configured to enable a thread in each CPU die to compete for a mutex of the CPU die in which the thread is located to obtain a thread that has obtained the mutex, a second competition unit 620, configured to enable the thread that has obtained the mutex to compete for a spin lock of the CPU to obtain a target thread that has obtained the spin lock, an execution unit 630, configured to execute a critical section corresponding to the target thread that has obtained the spin lock, and a releasing unit 640, configured to: after the critical section corresponding to the target thread is executed, release the mutex and the spin lock that are obtained by the target thread.

Optionally, the releasing unit 640 is configured to: after the critical section corresponding to the target thread is executed, first release the spin lock obtained by the target thread, and then release the mutex obtained by the target thread.

Optionally, the apparatus further includes the following: a checking subunit, configured to enable a thread that has not obtained the spin lock to continuously detect whether the spin lock is released, so that the thread that has not obtained the spin lock re-competes for the spin lock of the CPU after detecting that the spin lock is released.

Optionally, the apparatus further includes the following: a sleeping subunit, configured to enable a thread that has not obtained the spin lock to release an occupied resource of a CPU die in which the thread is located, so that the thread sleeps.

Optionally, after the releasing unit 640, the apparatus further includes the following: a wakeup subunit, configured to: if there is a sleeping thread for the released mutex, wake up the sleeping thread, so that the sleeping thread enters a CPU die corresponding to the mutex to re-compete for the mutex.

Optionally, the mutex of the CPU die is located in a private cache of the CPU.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previous apparatus implementation is merely an example. The units described as separate parts may or may not be physically separate, and parts displayed as units may or may not be physical units, may be located in one position, or may be distributed on a plurality of network units. Some or all of the modules can be selected based on actual requirements to achieve the objectives of the solutions of this specification. A person of ordinary skill in the art can understand and implement the implementations of this specification without creative efforts.

FIG. 6 illustrates internal function modules and structures of the apparatus for improving CPU performance. An actual execution body can be an electronic device, including the following: a processor, and a memory, configured to store an instruction that can be executed by the processor, where the processor is configured to: enable a thread in each CPU die to compete for a mutex of the CPU die in which the thread is located to obtain a thread that has obtained the mutex, where a corresponding mutex is disposed for each CPU die in a CPU, enable the thread that has obtained the mutex to compete for a spin lock of the CPU to obtain a target thread that has obtained the spin lock, execute a critical section corresponding to the target thread that has obtained the spin lock, and after the critical section corresponding to the target thread is executed, release the mutex and the spin lock that are obtained by the target thread.

Optionally, the releasing the mutex and the spin lock that are obtained by the target thread includes the following: first releasing the spin lock obtained by the target thread, and then releasing the mutex obtained by the target thread.

Optionally, the method further includes the following: enabling a thread that has not obtained the spin lock to continuously detect whether the spin lock is released, so that the thread that has not obtained the spin lock re-competes for the spin lock of the CPU after detecting that the spin lock is released.

Optionally, the method further includes the following: enabling a thread that has not obtained the spin lock to sleep to release an occupied resource of a CPU die in which the thread is located.

Optionally, after the releasing the mutex obtained by the target thread, the method further includes the following: if there is a sleeping thread for the released mutex, waking up the sleeping thread, so that the sleeping thread enters a CPU die corresponding to the mutex to re-compete for the mutex.

Optionally, the mutex of the CPU die is located in a private cache of the CPU.

In the foregoing implementation of the electronic device, it is worthwhile to note that the processor may be a central processing unit (CPU), or may be another general-purpose processor, a digital signal processor (DSP), an application-specific integrated circuit (ASIC), etc. The general-purpose processor may be a microprocessor, or the processor may be any conventional processor or the like. The memory may be a read-only memory (ROM), a random access memory (RAM), a flash memory, a hard disk, or a solid-state disk. The steps of the methods disclosed in the implementations of the present disclosure can be directly performed by a hardware processor, or performed by a combination of hardware and software modules in a processor.

The implementations of this specification are described in a progressive way. For same or similar parts of the implementations, references can be made to the implementations. Each implementation focuses on a difference from other implementations. Particularly, an electronic device implementation is basically similar to a method implementation, and therefore, is described briefly. For related parts, references can be made to related descriptions in the method implementation.

A person skilled in the present field can easily figure out other implementations of this specification after considering this specification and practicing the present disclosure here. This specification is intended to cover any variations, uses, or adaptations of this specification, and these variations, uses, or adaptations follow the general principles of this specification and include common knowledge or conventional techniques that are not disclosed in the technical field of this specification. This specification and the implementations are merely considered as examples, and the actual scope and the spirit of this specification are pointed out by the following claims.

It is worthwhile to note that this specification is not limited to the precise structures that have been described above and shown in the drawings, and various modifications and changes can be made without departing from the scope of this specification. The scope of this specification is limited by the appended claims only.

What is claimed is:

1. A method comprising:
    at each of a plurality of CPU dies of a CPU: enabling threads executing on the CPU die to compete for a respective mutex of the CPU die;
    identifying a plurality of threads that have each obtained the respective mutex;
    for each remaining thread that has not obtained any respective mutex:
        enabling the remaining thread to sleep in order to release an occupied resource of a corresponding CPU die in which the remaining thread is located; and
        maintaining a correspondence between the remaining thread and the corresponding CPU die so that the remaining thread resumes competing for the respective mutex of the corresponding CPU die once woken up:
    enabling the plurality of threads that have each obtained the respective mutex for a CPU die to compete for a spin lock of the CPU;
    identifying, from the plurality of threads, a target thread holding a mutex for a CPU die that has also obtained the spin lock of the CPU;
    executing a critical section corresponding to the target thread that has obtained the spin lock; and
    releasing the mutex and the spin lock that are obtained by the target thread.

2. The method according to claim 1, wherein the releasing the mutex and the spin lock that are obtained by the target thread comprises:
    first releasing the spin lock obtained by the target thread, and then releasing the mutex obtained by the target thread.

3. The method according to claim 2, further comprising:
    enabling one or more threads that have not obtained the spin lock to continuously detect whether the spin lock is released.

4. The method according to claim 3, further comprising:
    in response to detecting that the spin lock is released, re-competing, by the one or more threads that have not obtained the spin lock, for the spin lock of the CPU.

5. The method according to claim 1, wherein after the releasing the mutex obtained by the target thread, the method further comprises:
    determining whether there is a sleeping thread for the released mutex; and
    in response to a positive determining, waking up the sleeping thread, wherein the sleeping thread enters the CPU die corresponding to the released mutex to re-compete for the released mutex.

6. The method according to claim 1, wherein the mutex of the CPU die is located in a private cache of the CPU.

7. The method according to claim 1, wherein the mutex comprises a corresponding mutual exclusion lock.

8. The method according to claim 1, wherein executing the critical section corresponding to the target thread is uninterrupted in a single-core CPU.

9. A non-transitory, computer-readable medium storing one or more instructions executable by a computer system to perform operations comprising:
    at each of a plurality of CPU dies of a CPU, enabling threads executing the CPU die to compete for a respective mutex of the CPU die;
    identifying a plurality of threads that have each obtained the respective mutex;
    for each remaining thread that has not obtained any respective mutex:
        enabling the remaining thread to sleep in order to release an occupied resource of a corresponding CPU die in which the remaining thread is located; and
        maintaining a correspondence between the remaining thread and the corresponding CPU die so that the remaining thread resumes competing for the respective mutex of the corresponding CPU die once woken up:
    enabling the plurality of threads that have obtained the respective mutex to compete for a spin lock of the CPU;
    identifying, from the plurality of threads, a target thread holding a mutex for a CPU die that has also obtained the spin lock of the CPU;
    executing a critical section corresponding to the target thread that has obtained the spin lock; and
    releasing the mutex and the spin lock that are obtained by the target thread.

10. The non-transitory, computer-readable medium according to claim 9, wherein the releasing the mutex and the spin lock that are obtained by the target thread comprises:
    first releasing the spin lock obtained by the target thread, and then releasing the mutex obtained by the target thread.

11. The non-transitory, computer-readable medium according to claim 10, wherein the operations further comprise:
    enabling one or more threads that have not obtained the spin lock to continuously detect whether the spin lock is released.

12. The non-transitory, computer-readable medium according to claim 11, wherein the operations further comprise:

in response to detecting that the spin lock is released, re-competing, by the one or more threads that have not obtained the spin lock, for the spin lock of the CPU.

13. The non-transitory, computer-readable medium according to claim 9, wherein after the releasing the mutex obtained by the target thread, the operations further comprise:

determining whether there is a sleeping thread for the released mutex; and in response to a positive determining, waking up the sleeping thread, wherein the sleeping thread enters the CPU die corresponding to the released mutex to re-compete for the released mutex.

14. The non-transitory, computer-readable medium according to claim 9, wherein the mutex of the CPU die is located in a private cache of the CPU.

15. The non-transitory, computer-readable medium according to claim 9, wherein the mutex comprises a corresponding mutual exclusion lock.

16. The non-transitory, computer-readable medium according to claim 9, wherein executing the critical section corresponding to the target thread is uninterrupted in a single-core CPU.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

at each of a plurality of CPU dies of a CPU, enabling threads executing on the CPU die to compete for a respective mutex of the CPU die;

identifying a plurality of threads that have each obtained the respective mutex;

for each remaining thread that has not obtained any respective mutex:

enabling the remaining thread to sleep in order to release an occupied resource of a corresponding CPU die in which the remaining thread is located; and maintaining a correspondence between the remaining thread and the corresponding CPU die so that the remaining thread resumes competing for the respective mutex of the corresponding CPU die once woken up:

enabling the plurality of threads that have each obtained the respective mutex for a CPU die to compete for a spin lock of the CPU;

identifying, from the plurality of threads, a target thread holding a mutex for a CPU die that has also obtained the spin lock of the CPU;

executing a critical section corresponding to the target thread that has obtained the spin lock; and releasing the mutex and the spin lock that are obtained by the target thread.

18. The computer-implemented system according to claim 17, wherein the releasing the mutex and the spin lock that are obtained by the target thread comprises:

first releasing the spin lock obtained by the target thread, and then releasing the mutex obtained by the target thread.

\* \* \* \* \*

UNITED STATES PATENT AND TRADEMARK OFFICE
CERTIFICATE OF CORRECTION

| | | |
|---|---|---|
| PATENT NO. | : 10,983,839 B2 | Page 1 of 1 |
| APPLICATION NO. | : 16/743971 | |
| DATED | : April 20, 2021 | |
| INVENTOR(S) | : Ling Ma and Changhua He | |

It is certified that error appears in the above-identified patent and that said Letters Patent is hereby corrected as shown below:

In the Claims

Column 9, Line 42, in Claim 1, delete "mutex;" and insert -- mutex: --, therefor.

Column 9, Line 51, in Claim 1, delete "woken up:" and insert -- woken up; --, therefor.

Column 10, Line 29, in Claim 9, delete "CPU," and insert -- CPU: --, therefor.

Column 10, Line 30, in Claim 9, after "executing" insert -- on --.

Column 10, Line 45, in Claim 9, delete "woken up:" and insert -- woken up; --, therefor.

Column 10, Line 46, in Claim 9, after "have" insert -- each --.

Column 10, Line 47, in Claim 9, after "mutex" insert -- for a CPU die --.

Column 12, Line 3, in Claim 17, delete "CPU," and insert -- CPU: --, therefor.

Column 12, Line 17, in Claim 17, delete "woken up:" and insert -- woken up; --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*